Feb. 6, 1945.  P. B. HEINECK ET AL  2,368,659

REMOTE CONTROL SYSTEM

Filed Dec. 28, 1942

Inventors

Paul B. Heineck.
Alvin A. Meddock.

By  H. W. Brelsford

Attorney

Patented Feb. 6, 1945

2,368,659

UNITED STATES PATENT OFFICE 2,368,659

REMOTE CONTROL SYSTEM

Paul Benjamin Heineck and Alvin A. Meddock, North Hollywood, Calif., assignors, by mesne assignments, to Bendix Aviation Corporation, South Bend, Ind., a corporation of Delaware Application December 28, 1942, Serial No. 470,358

7 Claims. (Cl. 60—54.5)

This invention relates to fluid pressure systems for controlling elements remotely located from the operator, and relates more particularly to a fluid pressure control system capable of fulfilling the exacting demands of military airplanes.

Although this invention will be described as applied to the demands for airplane control, it is applicable to other uses. Airplanes have many units which must be accurately controlled and continuously moved during flight for maximum performance. These units may be quite remote from the pilot or engineer; such as engine controls on a multi-engined bomber or transport. For example, engine throttle, carburetor heat, oil coolers, cowl flaps, etc., must be carefully controlled at all times. This requires controls from the operator to the unit which controls are infallible in operation and exact in synchronization so that movement of the control will cause a movement of the controlled unit which is exactly the same.

In the past, cables have been largely used for this purpose, and have been formed in the necessarily tortuous path by the use of pulleys mounted on structural members within the wing. In other instances push-pull cable and housing units have been used. In either case, these mechanical controls are unsuited for the largest of modern planes because of the large amount of friction in long systems. The trend, therefore, is to provide airplanes with hydraulic (or pneumatic) control systems wherein there is little appreciable increase in friction with increased lengths of control systems.

The requirements of airplane controls are exacting. The driven unit must move exactly the same amount as the operators control. Thus there can be no free play, lost motion or back lash in the hydraulic system. Further, the operators control must be synchronized with the resultant movement; that is, the end of the operator's stroke must also be the end of the stroke of the driven unit. Thermal expansion of fluid must be provided for so that conduits will not be burst. Thermal contraction of fluid must be provided for so that vacuums in the fluid will not occur, upsetting the position of the setting. Means must be provided to lock the system between operations so that extreme vibration or changes in load will not upset the setting. Further, in military airplanes, provision must be made so that the control system will be entirely cut out if part of it is shot away or damaged, permitting the throttle, etc., to return to a given position for steady operation. The present invention is a two line, master cylinder and motor cylinder system having as parts thereof the necessary construction to provide these desirable functions.

It is, therefore, an object of the invention to provide a fluid control system eliminating the effects of fluid expansion and contraction.

Another object is to provide a fluid pressure system which is initially biased or pressure loaded to remove all slack and back lash.

Still another object is to provide a fluid pressure system wherein the master and motor units are automatically indexed so as to provide synchronism of subsequent movement of the units.

A further object is to provide a fluid system having a hydraulic lock so that differences of loading or vibration will not affect the position setting of the system.

Another object is to provide means combined with the hydraulic lock to release the lock upon a break in any conduit of the system, permitting the motor cylinder to return to a predetermined spring biased position.

Still another object is to provide means to close off the preload of the system whenever the conduits are broken by gun fire.

Other objects and advantages of the systems will become apparent in the following description and claims.

The drawing forming a part of this specification is a schematic drawing in full section, of the entire system and the parts thereof.

Referring to the drawing, power is generated in a master cylinder unit 10 including a cylinder housing 12, and a piston 14 therein connected to a piston rod 16. Pivoted to cylinder 12 is a link 18, to which is pivoted a manual handle 20, pivoted also to piston rod 16. The control unit shown is manually operated, but it will be appreciated that it could also be power driven insofar as the function of the system is concerned.

Leading from the left end of master cylinder 10 and connected to a motor unit 22, is a conduit 24. A similar conduit 26 is connected to the right end of master cylinder 10, and leads to motor unit 22 also. Motor unit 22 includes a cylindrical portion 28, in which is placed a reciprocal piston 30, having a piston rod 32. Piston 30 has a hole 34 therethrough, in which are placed valve poppets 36 and 38, oppositely biased by a common spring 40. Poppets 36 and 38 are the means by which the motor piston 30 is indexed or synchronized with relation to master piston 14. Acting upon piston 30 are helical springs 42 and 44, which hold piston 30 in a predetermined position when no other forces are applied to it. For example, if piston rod 32 is connected to the throttle of an airplane motor, springs 44 and 42 will hold the throttle in a position about 60 percent open.

Conduits 24 and 26 connect with an auxiliary cylinder 46 in slave housing 22, in which cylinder there is placed a pressure-responsive shuttle piston 48 normally centered by two springs 50 and 52 respectively. Springs 50 and 52 are not strictly necessary, as will be apparent later, but may be included for convenience. On the left side of cylinder 46 is a short chamber 54 connected with cylinder 46 through an opening normally closed by a poppet 56, urged toward its seat by a conical spring 58. A passage 60 connects chamber 54 with the left end of motor cylinder 28. A similar construction is provided on the right end of cylinder 46. There a chamber 62 has an opening to chamber 46, which is normally closed by a poppet 64, urged toward its seat by a conical spring 66. A passage 68 connects chamber 62 with the right end of motor cylinder 28.

The structure just defined comprises a hydraulic lock for the motor cylinder 28. Thus, when motor cylinder 28 is filled with fluid, piston 30 is prevented from moving in either direction by poppets 56 and 64, which seal the flow of fluid which might otherwise occur if a load were placed upon piston rod 32. When it is desired to operate the motor piston 30 in one direction or the other, pressure is applied thereto by moving manual handle 20 on the master unit in the desired direction. The fluid pressure thus generated opens either poppet 64 or 56 so that the fluid pressure is applied to the adjacent end of the cylinder 28 through passage 68 or 60; the fluid pressure also forces the shuttle piston 48 toward either poppet 56 or 64 to release it and permit fluid to exhaust from the adjacent end of the cylinder 28. This action permits the motor piston 30 to move under the influence of the generated pressure. When the handle 20 has been moved to the end of its travel and has been released, the motor piston backs up a few thousandths of an inch, permitting the piston 48 to restore and the exhaust poppet to close. Although, for purposes of clarity, a considerable gap is shown in the drawing between the stems of piston 48 and the poppets which the piston contacts, in actual practice this clearance is reduced to a few thousandths of an inch on each end; for example, four-thousandths of an inch.

The automatic indexing means in piston 30 operate as follows to synchronize movement of motor piston 30 with master piston 14: if master piston 14 is moved to one extreme of its stroke by manual handle 20, for example to the left, there may be too much fluid in the conduit and the motor unit 22, preventing master piston 14 from reaching the extreme end of master cylinder 12. However, when motor piston 30 reaches the extreme end of its stroke, which will be the right end of motor cylinder 28, the stem on poppet 38 will contact the end of cylinder 28, opening passage 34 through piston 30. In this case, continued pressure upon master piston 14 has caused fluid under pressure to lift poppet 36 off of its seat and flow through the piston 30 to the other end of piston 30. This action continues until master piston 14 reaches the extreme end of its stroke, at which time flow through piston 30 ceases. If too little fluid is present in conduit 24 and slave unit 22 to move slave piston 30 to the extreme right, poppet 38 will not be opened. This means merely that there is too much fluid in the other half of the system which can be corrected by moving the master piston 14 in the opposite direction, to relieve the excess of fluid from that half of the system, as has just been described.

The remaining elements of motor unit 22 comprise means to release the hydraulic lock just described in the event that either conduit 24 or conduit 26 is shot away, or otherwise broken during flight of an airplane in which the system is placed. Release of the hydraulic lock is necessary because breakage of the conduits make further control impossible, and the particular control device, for example the throttle, should be automatically positioned by springs 42 and 44 to a predetermined position, which, in the case of a throttle, may be 60 percent open. Since a break in either conduit means a relief or release of pressure in that conduit, means are provided to respond to such a drop in pressure to release poppets 56 and 64, which form the hydraulic lock. Accordingly, in the left half of motor unit 22, a passage 70 is provided leading from conduit 24 to a chamber 72, in which is placed a piston 74 resting on a shoulder and urged to the left by a spring 76. Piston 74 has a lost motion connection 77 with poppet 56, so that poppet 56 will be pulled off of its seat when piston 74 moves to the left. The chamber retaining the spring 76 is vented to atmosphere by a passage 78, shown in dotted outline. Piston 74 is held on its shoulder, in the position shown, by a preload of three hundred pounds on the entire hydraulic system, which will be explained later. When conduit 24 is shot away, this preload pressure will be relieved in the broken conduit 24, and spring 76 will urge piston 74 to the left, pulling poppet 56 off of its seat.

The stiffness of spring 76 is insufficient to overcome the force exerted on piston 74 by the preload pressure but it is much stiffer than the spring 58 and the spring of poppet 80. In fact, the springs on poppets 80 and 84 and on poppets 56 and 64 are only stiff enough to seat the valves in the absence of any appreciable differential fluid pressure working against them. Furthermore, the effective areas of the poppets 80 and 84 and 56 and 64 may be relatively small so that the forces applied to those poppets by the fluid pressure are small as compared to the forces exerted by the springs 76 and 90.

When piston 74 moves to the left due to release of the preload when conduit 24 is broken, it not only pulls poppet 56 off its seat to release the hydraulic lock on that side, but it also opens a poppet 80 which controls flow from a passage 82 to the outer side of a similar poppet 84 on the extreme right of motor unit 22. This action of opening poppet 80 vents passage 82 to atmosphere when the line is broken, relieving pressure behind poppet 84 also. This release of pressure permits the preload in the right side of motor unit 22 to lift poppet 84 off of its seat, venting the preload to atmospheric pressure. After a minute flow of preload fluid, the preload is automatically cut off as will be explained later, allowing the remaining fluid in conduit 26 and the right end of slave unit 22 to be vented to atmospheric pressure through poppet 84. This release of pressure permits a piston 86 in the right half of slave unit 22, corresponding to piston 74, to move to the right in its chamber 88 under the influence of a spring 90. Piston 86 has a lost motion connection 92 with poppet 64, and when it moves to the right, piston 86 pulls poppet 64 off of its seat, releasing the right hand fluid trap also.

Although passage 82 and the chambers containing poppets 80 and 84 are normally filled with fluid at preload pressure, the spring 76 can open poppet 80 against this pressure because of the small effective area of the poppet valve and the fact that only microscopic movement of the poppet off its seat releases the pressure in the closed space.

If conduit 26 is shot away instead of conduit 24, this same sequence of events takes place, but in the reverse direction.

From the foregoing, it is quite evident that the operation of the fluid trap and the trap release mechanism are closely interrelated, and further that the operation of the fluid trap release is clearly facilitated by the presence of a preload in the hydraulic system.

The mechanism for providing the preload and the expansion relief will now be described. Placed between conduits 24 and 26 in the drawing is an accumulator 100 supplying hydraulic fluid under a substantially constant pressure; for example, two or three hundred pounds. Accumulator 100 is connected by a conduit 102 to a T member 104, having a fluid conduit 106 leading to conduit 24 and a similar conduit 108 leading to conduit 26. In the upper part of T member 104 is a poppet 110 seated in a cylindrical chamber 112 very closely, but urged away from its seat by a coil spring 114. The fit of poppet 110 in its chamber 112 is such that a few drops a minute may leak past the poppet 110 without causing movement of the same, but if a sudden flow from accumulator 100 should be encountered, the difference in pressure present would seat poppet 110 against the force of its spring 114 and stop all further flow from the accumulator. This action takes place when either conduit 24 or 26 is shot away, in which case there is a sudden release of pressure within T member 104, which seats poppet 110. Thus, whenever there is a break in a conduit there is little fluid lost from the accumulator. As contraction of hydraulic fluid occurs in either master cylinder, motor unit 22, or conduit 24 or 26, as when an airplane flies to the frigid altitudes, this deficiency in volume will be made up by the slow flow of fluid around poppet 110 from accumulator 100. In such a case the fluid merely lifts check poppets 116 and 118 off of their seats to reach connected conduits 108 and 106 respectively. Thus at all times the preload pressure is present and the hydraulic store of fluid in accumulator 100 supplies any deficiency of fluid due to contraction leakage.

If expansion of the fluid should be encountered, as when an airplane descends from a high altitude to a ground station, at a high temperature, this expansion will cause an increase in pressure in the conduits above the preload pressure and above the operating pressure for the system. In this event, relief valves 120 and 122 may be overcome, venting this surplus volume to the accumulator 100 through passages 124 and 126, in T member 104. By accurately adjusting relief valves 120 and 122 to relieve at the same high pressure, the volume of fluid removed or relieved from the system will represent only that portion due to thermal expansion, and not any due to actuation pressure generated by the master cylinder unit 10.

The invention has now been described completely in accordance with the patent statutes. Although this description has been made with reference to a particular embodiment thereof, it is not limited to these embodiments, nor otherwise, except by the terms of the following claims.

We claim:

1. In a hydraulic remote control system comprising a master unit and a motor unit interconnected by a pair of fluid conduits, the master unit including means for selectively circulating fluid through either conduit to the motor unit and back from the motor unit through the other conduit to the master unit, and the motor unit including cylinder means and piston means reciprocal therein in response to said fluid circulation; means for normally maintaining a preload pressure in both said conduits substantially in excess of the magnitude of the differential pressure between said two conduits resulting from said fluid circulation produced by said master unit; and means in said motor unit responsive to failure of said preload pressure for establishing direct fluid connection between opposite ends of said motor cylinder whereby the motor piston is released from hydraulic control.

2. A system as described in claim 1 in which said last mentioned means includes an auxiliary cylinder having one end connected to one of said conduits and the other end vented to atmosphere, an auxiliary piston in said auxiliary cylinder normally maintained in said other end thereof by preload pressure in said conduit, spring means for moving said auxiliary piston to said one end of said auxiliary cylinder in response to failure of said preload pressure, and valve means responsive to movement of said auxiliary piston by said spring means for directly interconnecting said two conduits.

3. The hydraulic remote control system as described in claim 1 in which said last mentioned means includes a short circuiting passage, a check valve means at each end of said passage communicating with said fluid conduits, each check valve permitting flow from the associated conduit into said short circuiting passage but normally preventing reverse flow, a pair of auxiliary pistons, one associated with each of said check valves and arranged to open its associated check valve in one end position, the said one end of each auxiliary piston being permanently connected to its associated conduit whereby preload pressure in said conduits maintains said auxiliary pistons out of opening relation with their associated check valves, and spring means associated with each auxiliary piston for moving it into position to open its associated check valve in response to failure of preload pressure in the associated conduit.

4. A hydraulic remote control system as described in claim 1 including in said motor unit a pair of check valves one between each of said conduits and said working cylinder for normally permitting flow from the conduit into the motor cylinder while preventing reverse flow, means responsive to differential pressure between said two conduits for opening the check valve associated with the conduit of lower pressure; said last mentioned means of claim 1 including means for directly interconnecting said two conduits at the motor unit and means for opening said check valves.

5. The hydraulic remote control system as described in claim 1 in which said means for normally maintaining a preload pressure comprises a reservoir of fluid under preload pressure and means connecting said reservoir to said conduits, restrictor valve means in said connection for normally permitting slow flow between said reservoir and said conduits and means for preventing all flow between said reservoir and said conduit in response to a pressure drop between said reservoir and said conduit in excess of a predetermined value.

6. A hydraulic remote control system as described in claim 1 in which said means for normally maintaining a preload pressure comprises a reservoir of fluid under preload pressure, means defining a passage, valve means for normally permitting slow flow of fluid in either direction between said reservoir and said passage, means for preventing flow from said reservoir to said passage in response to a predetermined drop of the pressure in said passage below the pressure in said reservoir, check valve means independently connecting said passage with each conduit for permitting free flow of fluid from said passage to said conduits, and separate relief valve means for permitting a flow of fluid from either conduit to said passage in response to a predetermined rise in the pressure in the conduits above the pressure in said passage.

7. A hydraulic remote control system comprising a master unit and a motor unit interconnected by a pair of fluid conduits, means for normally maintaining a preload pressure in said system comprising a source of fluid under pressure, means providing a restricted passage between said source and said system for permitting slow flow of fluid between said source and said system in either direction to compensate for contraction and expansion of the fluid in said system and means responsive to a substantial pressure drop in said system relative to the pressure in said source for blocking all flow of fluid from said source to said system.

PAUL BENJAMIN HEINECK.
ALVIN A. MEDDOCK.